United States Patent Office 2,796,320
Patented June 18, 1957

2,796,320
SOLVENT EXTRACTION PROCESS FOR PURIFICATION OF THORIUM

Frank Harold Spedding, Ames, Iowa, and Arthur Kant, Pittsburgh, Pa., assignors to the United States of America as represented by the United States Atomic Energy Commission No Drawing. Application April 8, 1947,
Serial No. 740,274

13 Claims. (Cl. 23—14.5)

This invention relates to the separation of thorium from an aqueous solution by solvent extraction, to the extraction of thorium from an organic solution and to the purification of thorium.

With the development of neutronic reactors for the production of plutonium by neutron bombardment of $U^{238}$, it has been found that the neutrons which would normally escape from the reactor can be utilized by placing a blanket of thorium or thorium oxide around the reactor. These neutrons are absorbed by thorium, which is chiefly $Th^{232}$, to produce $Th^{233}$. The latter decays with a half-life of 23.5 minutes to $Pa^{233}$ which in turn decays with a half-life of 27.4 days to $U^{233}$. Some of the neutrons escaping from the uranium neutronic reactor are fast neutrons and these with slow neutrons cause fission of $Th^{232}$ and some of the $U^{233}$ produced, producing radioactive fission fragments. By the use of this thorium blanket desirable $Pa^{233}$ and $U^{233}$ are produced. For the process to be efficient it is necessary that the thorium blanket contain negligible amounts of impurities that have a high-capture cross-section such as boron and rare earths. Thus, the problem is to develop a process for purifying thorium by removal of the rare earths and other impurities. The existing processes for producing thorium and thoria from thorium-containing ore do not give the desired degree of purification.

An object of this invention is to purify thorium from its aqueous solutions containing rare earths and other impurities.

A second object of this invention is to separate thorium from its aqueous solutions containing water-soluble salts.

Another object of this invention is to provide a method for separating thorium from its solution in the organic solvent used to extract thorium from aqueous solutions.

Other objects of this invention will be apparent from the description which follows.

We have found that a suitable purification of thorium can be made by extracting a thorium salt aqueous solution which contains a high concentration of a salting-out agent by means of a liquid organic solvent that has an atom capable of donating an electron pair to a coordination bond.

There are several types of organic compounds that are satisfactory solvents for the extraction of a thorium salt from an aqueous solution containing a salting-out agent. These types are ethers, glycol ethers, esters, ketones, alcohols, alkyl phosphates, nitrohydrocarbons, and alkyl sulfides. A common structural property of all of these types of compounds is that they have an atom capable of donating an electron pair to a coordination bond. The extractive solvent is a liquid substantially immiscible with water and aqueous solutions. If it is a solid at room temperature, the extraction is carried out at a temperature above its melting point. The following is a list of compounds that are suitable extractants for the separation of a thorium salt from aqueous solutions containing salting-out agents:

Ethyl ether
Isopropyl ether
Butoxyethoxyethane (ethyl butyl Cellosolve)
Diethyl ether of ethylene glycol (diethyl Cellosolve)
Dibutyl ether of diethylene glycol (dibutyl Carbitol)
Dibutyl ether of tetraethylene glycol
Ethyl acetate.
n-Propyl acetate
Butoxyethoxyethyl acetate (butyl Carbitol acetate)
Methyl isobutyl ketone (hexone)
Acetophenone
Mesityl oxide
Cyclohexanone
Tert-amyl alcohol
2-ethyl-1-hexanol
Tributyl phosphate
Trioctyl phosphate
Dioctyl hydrogen phosphate
Octadecyl dihydrogen phosphate
Nitromethane
Ethyl sulfide
n-Propyl sulfide By alkyl phosphates we means compounds having the general formula:

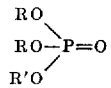

where R is a hydrogen atom or an alkyl radical and R' is an alkyl radical. The total number of carbon atoms is preferably at least 12 to provide adequate water-immiscibility.

In addition to using the individual solvents the present invention contemplates the use of solvents that are mixtures of the various types. Some of these types of organic solvents are more effective than other types. For example, we prefer to use the glycol ethers, which are also known as polyethers, instead of the monoethers, such as ethyl ether, since they are considerably more efficient as will be seen from the data that will be presented below. The common characteristic of some of the types of organic solvents that have been found to be most satisfactory is that they have an oxygen atom connected to another atom by a double bond. These types are the ketones, esters, alkyl phosphates and nitrohydrocarbons.

The extraction process of the present invention uses a very water-soluble nitrate or chloride including nitric acid and hydrochloric acid as the salting-out agent. Other inorganic salts that are very soluble in water may be used as the salting-out agent provided that the anion of the salt does not act as a complexing agent for the thorium ion. In all cases the salting-out agent to be used must have a low solubility in the organic solvent as well as a high solubility in water.

The extraction process may be carried out using a high concentration of nitric acid or hydrochloric acid and preferably nitric acid. This solution may be obtained directly when thorium or its oxide is dissolved, or it may be obtained by the addition of the desired amount of concentrated acid to an aqueous solution of a thorium salt. When free acid is used we prefer that the concentration be at least 2 M.

When a water-soluble inorganic salt is used as the salting out agent of the process, we prefer to use one of the following nitrates as the salting-out agent: $NaNO_3$, $Ca(NO_3)_2$, $KNO_3$, $Sr(NO_3)_2$, $LiNO_3$, $Mg(NO_3)_2$, $NH_4NO_3$, $La(NO_3)_3$, $Mn(NO_3)_2$, $Al(NO_3)_3$. The actual molar concentration of the inorganic salt used will depend upon the valence of the cation and the concentration of the anion desired. In general, the salt concentration will be between 3 and 12 M.

Since it is desirable in many cases to use a metal salt such as a metal nitrate as the salting-out agent and since it is desirable in some cases to have a small amount of free nitric acid or hydrochloric acid present, in our process we may use a mixture of the inorganic acid and a water-soluble metal salt. We prefer that the metal salt, such as a metal nitrate, be the predominant component of the mixture of salting-out agents. For example, when the aqueous solution is 1 M $HNO_3$, it is desirable to employ a concentration of a univalent nitrate of at least 3 M, and preferably 5 to 10 M. Equivalent concentrations of polyvalent nitrates may be employed at the same acid concentration. With increase or decrease in acid strength the salt concentration may be accordingly decreased or increased to provide a suitable anion concentration for the salting-out of thorium. When other water-soluble inorganic salts are used, they will be added to provide equivalent concentrations.

We prefer that the extraction of thorium be carried out using an aqueous solution of thorium nitrate. The concentration of the thorium nitrate in an aqueous solution may be varied greatly, for example, thorium nitrate was extracted from aqueous solutions having concentrations ranging from 0.2 M to about 2 M.

A large number of experiments were carried out in which a volume of an aqueous solution containing thorium nitrate containing another water-soluble metal nitrate with or without nitric acid was contacted for about 10 to 15 minutes with an equal volume of an organic solvent. The two phases were separated and the volumes were noted. An aliquot portion of the organic solvent phase was analyzed for thorium nitrate content in order to determine the percent thorium nitrate that was extracted. The data obtained using examples of the various types of organic solvents of the present invention are presented in Tables 1, 2, and 3. For all data in Tables 2 and 3 and for some of the data in Table 1, the solvents used were first saturated with water before use as extractants. This was done as otherwise in some cases enough water was drawn from the aqueous phase so as to cause crystallization of the syrupy, highly concentrated salt solution.

It can be seen from the data in Table 1 that solvents of this invention are effective for the extraction of thorium nitrate from aqueous solutions containing salting-out agents. In some cases, for example, using nitromethane, the percent extraction can be increased by a change of the type of metal nitrate used and a change of concentration of metal nitrate and nitric acid. These experiments were for a one-stage extraction and, of course, the percent extracted may be increased by carrying out the extraction using several stages. For example, four successive hexone extractions were made on an aqueous Table 1

| Solvent | $Th(NO_3)_4 \cdot 4H_2O$ (g./100 ml. Aq. soln.) | Molarity $HNO_3$ | Nitrate Molarity | Nitrate Cation | Percent $Th(NO_3)_4$ Extracted by solvent |
|---|---|---|---|---|---|
| Ethyl ether | 35 | 4 | 3 | Ca | 60 |
| Isopropyl ether | 35 | 3 | 3 | Ca | 20 |
| Ethyl butyl Cellusolve | 35 | 3 | 3 | Ca | 60 |
| Diethyl Cellulosolve | 25 | 3 | 10 | $NH_4$ | 70 |
| Dibutyl Carbitol | 35 | 3 | 3 | Ca | 84 |
| Dibutyl ether of tetraethylene glycol | 35 | 3 | 3 | Ca | 99 |
| Ethyl acetate | 35 | 3 | 3 | Ca | 77 |
| n-Propyl acetate | 35 | 3 | 3 | Ca | 46 |
| Butyl Carbitol acetate | 35 | 3 | 3 | Ca | 85 |
| Hexone | 30 | 3 | 3 | Ca | 57 |
| Do | 12.5 | 0.7 | 5 | Ca | 90 |
| Do | 10 | 0 | 5 | Ca | 91 |
| Acetophenone | 5.9 | 1 | 10 | $NH_4$ | 37 |
| Mesityl oxide | 35 | 3 | 3 | Ca | 78 |
| Cyclohexanone | 25 | 1 | 10 | $NH_4$ | 85 |
| Do | 12.5 | 0.7 | 5 | Ca | ca. 100 |
| Do | 10 | 0 | 3 | Ca | 92 |
| Do | 10 | 0 | 5 | Ca | 96 |
| tert-Amyl alcohol | 35 | 3 | 3 | Ca | 63 |
| 2-Ethyl-1-hexanol | 35 | 3 | 3 | Ca | 10 |
| Tributyl phosphate | 25 | 1 | 10 | $NH_4$ | 91 |
| Nitromethane | 5.4 | 1 | 10 | $NH_4$ | 11 |
| Do | 35 | 3 | 3 | Ca | 32 |

Table 2

| Solvent | $Th(NO_3)_4 \cdot 4H_2O$ (g./100 ml. Aq. soln.) | M. Conc. of $HNO_3$ | M. Conc. of Salt | Salt used | Percent $Th(NO_3)_4$ Extracted by solvent |
|---|---|---|---|---|---|
| Hexone | 8 | 0.5 | 1.9 | $Al(NO_3)_3$ | 49 |
| Do | 8 | 0.9 | 1.7 | $Al(NO_3)_3$ | 36 |
| Do | 12.5 | 0.7 | 5 | $Ca(NO_3)_2$ | 90 |
| Do | 25 | 1 | 10 | $NH_4NO_3$ | 85 |
| Do | 30 | 0 | 3 | $Ca(NO_3)_2$ | 35 |
| Do | 50 | 0 | 3 | $Ca(NO_3)_2$ | 50 |
| Cyclohexanone | 8 | 0.5 | 1.9 | $Al(NO_3)_3$ | ca. 100 |
| Do | 8 | 0.9 | 1.7 | $Al(NO_3)_3$ | 95 |
| Do | 9 | 0.5 | 3.8 | $Cu(NO_3)_2$ | ca. 100 |
| Do | 10 | 0 | 3 | $Ca(NO_3)_2$ | 92 |
| Do | 10 | 0 | 5 | $Ca(NO_3)_2$ | 96 |
| Do | 12.5 | 0.7 | 5 | $Ca(NO_3)_2$ | ca. 100 |
| Do | 20 | 1.1 | 7 | $AgNO_3$ | 58 |
| Do | 25 | 1.4 | 4.2 | $Mn(NO_3)_2$ | ca. 100 |

Table 3

| $Th(NO_3)_4 \cdot 4H_2O$ (g./100 ml. Aq. soln.) | $HNO_3$ Molarity | $Ca(NO_3)_2$ Molarity | Percent $Th(NO_3)_4$ Extracted by Hexone |
|---|---|---|---|
| 10 | 0 | 3 | 11 |
| 10 | 0 | 5 | 91 |
| 30 | 0 | 3 | 35 |
| 50 | 0 | 3 | 50 |
| 10 | 1 | 3 | 34 |
| 30 | 1 | 3 | 45 |
| 50 | 1 | 3 | 56 |
| 10 | 2 | 3 | 49 |
| 30 | 2 | 3 | 52 |
| 50 | 2 | 3 | 63 |
| 10 | 3 | 3 | 60 |
| 30 | 3 | 3 | 57 |
| 50 | 3 | 3 | 53 |
| 10 | 5 | 2 | 50 |
| 30 | 5 | 2 | 41 |
| 50 | 5 | 2 | 44 | solution containing 50 g. $Th(NO_3)_4 \cdot 4H_2O$ per 100 ml. of solution and which was 3 M $Ca(NO_3)_2$ and 3 M $HNO_3$. In each extraction one volume of hexone per volume of the aqueous phase was used. The four extractions removed 92.5% of the total thorium nitrate. This compares with 53% removed in a single extraction as shown below in Table 3. Thus, in the case of isopropyl ether and acetophenone it is expected that multi-stage extraction would satisfactorily extract thorium nitrate from an aqueous salt solution.

Table 2 shows that various metal nitrates are effective salting-out agents. In addition, Table 2 and especially Table 3 show the wide range of efficiency of a one-stage extraction obtained by varying the salting-out agent and by varying the ratio of nitric acid and other salting-out agent.

Aqueous solutions of thorium nitrate in varying concentrations and containing rare earth nitrates, having $2.1 \times 10^7$ disintegrations per minute, 3 M $Ca(NO_3)_2$ with or without $HNO_3$ were contacted for five minutes with one volume of hexone per 1.08 volumes of aqueous solution. After separation the hexone phase in each case was analyzed for thorium and rare earth content as follows: an aliquot (0.13 ml.) of the organic solvent phase was dissolved in 5 to 10 ml. hot water. Five mg. $La^{+3}$ carrier was added as well as $H_2O_2$, thereby precipitating the thorium as thorium peroxide nitrate. To the aqueous solution ammonium hydroxide was added, precipitating $La(OH)_3$. This precipitate was dissolved by the addition of $HNO_3$ and the resultant $La(NO_3)_3$ solution was made 2 to 6 N using HF. $LaF_3$ precipitated and it contained rare earth fluorides. The radioactivity was counted by reading on an electroscope. The results of these experiments are shown below in Table 4 and the purification factor in the last column is defined as the ratio of percent thorium extracted to the percent rare earths extracted.

Table 4

| Molarity $Th(NO_3)_4$ | Molarity $HNO_3$ | Percent Thorium Extracted | Percent Rare Earths Extracted | Approximate Purification Factor |
| --- | --- | --- | --- | --- |
| 0.215 | 0 | 54 | 0.11 | 490 |
| 0.215 | 1 | 35 | 0.10 | 350 |
| 0.430 | 1 | 42 | 0.31 | 140 |
| 0.860 | 1 | 56 | 1.1 | 51 |
| 0.215 | 3 | 56 | 0.14 | 400 |
| 0.860 | 3 | 54 | 0.47 | 115 |

These data show that a high purification of thorium relative to the rare earths was obtained, especially when the thorium nitrate concentration was at the lowest value indicated.

Other experiments were carried out to study the solvent extraction of high-capture cross-section elements as nitrates, namely boron, cadmium and the rare earth lanthanum, as well as one experiment using a tracer quantity of rare earths. The aqueous solutions used were 10 M $NH_4NO_3$ and 1 M $HNO_3$, and equal volumes of aqueous solution and organic solvent were used. These results are presented in Table 5 below and the extraction coefficient values show that solvents of the type used in this invention are very poor extractants for such metal nitrates from aqueous solutions containing salting-out agents.

Table 5

| Solvent | Metal Nitrate | | Percent Metal Nitrate Extracted | K[1] |
| --- | --- | --- | --- | --- |
| | Metal | Conc. (g./100 ml. soln.) | | |
| Hexone | La | 0.43 | 0.1 | $1 \times 10^{-3}$ |
| Do | Cd | 2.16 | <0.2 | $<2 \times 10^{-3}$ |
| Do | B | 0.009 | 0.25 | $2.5 \times 10^{-3}$ |
| Cyclohexanone | La | 1.51 | 0.47 | $5.1 \times 10^{-3}$ |
| Do | Ce | 1.34 | 2.3 | $25 \times 10^{-3}$ |
| Do | Cd | 0.92 | 0.44 | $4.8 \times 10^{-3}$ |
| Do | Rare Earths [2] | Tracer quantities | 4.88 | $56 \times 10^{-3}$ |

[1] $K = \dfrac{\text{Concn. in organic solvent phase}}{\text{Conc. in aqueous phase}}$

[2] Aqueous solution initially was 0.215 M $Th(NO_3)_4$, 10 M $NH_4NO_3$, 1 M $HNO_3$.

Another aspect of this invention is to provide a process for separating thorium from a substantially water-immiscible liquid organic solvent solution of a thorium salt such as is obtained by extracting an aqueous solution of thorium containing a salting-out agent or a mixture of salting-out agents as described above. We have found that a thorium salt can be efficiently extracted from such organic solvent solutions by contacting with water or with an aqueous solution of a acid. It is preferred that water be used, as in some cases the acid solution is less efficient. The preferred acid is nitric acid, although other acids such as hydrochloric acid may be used. An acid concentration of below 2 molar is preferred. For example, several experiments using this aspect of the invention are reported in Table 6 in which hexone and cyclohexanone solutions of thorium nitrate were contacted in some cases with an equal volume of water and in other cases with an equal volume of dilute $HNO_3$. These organic solvent solutions were obtained by adding $Th(NO_3)_4 \cdot 4H_2O$ to the organic solvent. Where the larger amounts of hydrated thorium nitrate were used, the water of hydration separated and the resultant organic solution was used. These organic solvent solutions also contained small amounts of $HNO_3$ and $Ca(NO_3)_2$.

Table 6

| Solvent | $Th(NO_3)_4 \cdot 4H_2O$ Conc. (g./100 ml. solvent soln.) | Percent $Th(NO_3)_4$ Extracted by— | |
| --- | --- | --- | --- |
| | | Water | 1.5 M $HNO_3$ |
| Hexone | 0.6 | 96.5 | |
| Do | 2.5 | 98.0 | |
| Do | 10 | 96.6 | 96.2 |
| Do | 25 | 99.1 | 99.3 |
| Cyclohexanone | 9 | 99.0 | 82.7 |
| Do | 15 | 91.0 | 80.0 |
| Do | 43 | 93.6 | 78.0 |

The data illustrate the efficiency of this process.

Another aspect of the present invention is the combination of the two extraction processes described above. By the use of this combination process thorium is purified by separation of rare earth and other impurities. In the combination process an aqueous solution of pure thorium salt is obtained and this can be converted to the metal by conventional means such as the precipitation of thorium as an oxalate, ignition of the precipitate to the dioxide, treatment of the latter with HF to produce $ThF_4$, which is then reduced by heat and reaction with an alkali or alkaline earth metal such as calcium.

This aspect of the invention was tested by the use of a pilot plant using a continuous countercurrent liquid-liquid extraction system. The extraction system consisted of two columns of 3-inch Pyrex glass, each packed with Berl saddles. The aqueous feed solution was 0.445 M $Th(NO_3)_4$, 3 M $Ca(NO_3)_2$ and 3 M $HNO_3$. This feed solution was introduced into the first column, which was twenty-six feet high, at a point at about one-fourth of the distance from the top. The liquid organic solvent used for extraction of thorium nitrate was methyl isobutyl ketone, i. e., hexone, and it was introduced at the bottom of the column. The aqueous raffinate phase was drawn off at a point almost at the bottom of this column and the organic extract phase was drawn off at a point almost at the top of the column. An aqueous scrubbing solution containing 3 M Ca(NO₃)₂ and 3 M HNO₃ was introduced at the top of this column. The organic extract phase from the first column was introduced into the second column, which was eighteen feet high, at the bottom and distilled water was introduced at the top of the second column. The aqueous extract phase and the organic raffinate phase from this column were drawn off respectively near the bottom and top of the column. The organic raffinate phase was sent to a hexone storage tank, from which it was drawn off for use as an extractant in the first column.

In both of the extraction columns hexone was the dispersed phase and this was accomplished by suitable interphase leveling devices. The optimum extraction of thorium nitrate was obtained with the following flow rates of column solutions:

|  | G. P. H. |
|---|---|
| Feed solution | 7–8 |
| Scrubbing solution | 1 |
| Hexone | 15 |
| Water | 3 |

The pilot plant runs indicated that the optimum hexone-to-feed ratio was between 2–2½ but other ratios may be used such as from 1 to 5. Using a hexone-to-feed ratio of 2, thorium nitrate extraction of 99.7% for the combination process was consistently obtained.

This continuous countercurrent combination extraction process was carried out using an aqueous thorium nitrate solution, in which the thorium nitrate had been analyzed spectrographically for various rare earths. The thorium nitrate obtained as the final aqueous extract solution was also analyzed spectrographically for these rare earths. The percentage of each is indicated in Table 7 and for the purified thorium nitrate the actual analysis showed no detectable rare earths were present.

Table 7

| Rare Earth Metal | Conc. of Rare Earth Metal in p. p. m.[1] | |
|---|---|---|
|  | Original Th(NO₃)₄ | Hexone Extracted Th(NO₃)₄ |
| Ce | 24 | [2] <0.4 |
| La | 8 | [3] <0.04 |
| Nd | 6 | [2] <0.2 |
| Dy | 0.1 | [2] <0.05 |
| Pr | 3 | [2] <0.1 |
| Sm | 0.8 | [2] <0.2 |
| Y | 1 | [2] <0.05 |
| Gd | 0.5 | [2] <0.04 |

[1] Content based on thorium metal.
[2] Not detected.
[3] Doubtful detection.

The values indicated for the purified thorium nitrate are based on the minimum amount that must be present for each element in order to be detected. From these data it is seen that a high degree of purification of thorium was obtained by the use of the process of this invention.

Most of these solvents extract a major proportion of the HNO₃ present in the initial solution, but the water extraction process removes most of it from the organic solvent as well as thorium nitrate. However, on long standing the HNO₃ remaining reacts with some of the solvents, such as hexone, and this is avoided by a water wash before storing the solvent. The metal nitrates used as salting-out agents are not appreciably extracted by the organic solvents, e. g., hexone extracts less than 1% of the calcium nitrate.

As illustrated by the example given above well-known extraction procedures and apparatus may be used in the present invention. Thus, the extraction steps may be effected by the use of batch, continuous batch, batch countercurrent, or continuous countercurrent methods. A more efficient extraction was obtained using the continuous countercurrent method of extraction. In all cases the ratio of liquid organic solvent to initial aqueous solution may vary widely and the optimum ratio will depend upon the particular organic solvent used. Ratios of between 1 and 10 are preferred. The organic solvent may be either the dispersed phase or the continuous phase, and the former is the preferred mode of operation.

The foregoing illustrations and embodiments of this invention are not intended to limit its scope, which is to be limited entirely by the appended claims.

We claim:

1. A process for the separation of thorium from an aqueous solution containing thorium nitrate, which comprises adding to said aqueous solution at least one material of the group consisting of nitric acid, sodium nitrate, potassium nitrate, lithium nitrate, ammonium nitrate, magnesium nitrate, calcium nitrate, strontium nitrate, manganese nitrate, aluminum nitrate and lanthanum nitrate, contacting the resulting solution with a liquid organic solvent which is substantially immiscible with said solution, said solvent containing at least one atom capable of donating an electron pair to a coordination bond, and separating the resultant extract phase containing thorium salt and raffinate phase.

2. A process for the separation of thorium from an aqueous solution containing thorium nitrate, which comprises adding to said aqueous solution at least one material of the group consisting of nitric acid, sodium nitrate, potassium nitrate, lithium nitrate, ammonium nitrate, magneisum nitrate, calcium nitrate, strontium nitrate, manganese nitrate, aluminum nitrate and lanthanum nitrate, contacting the resulting solution with a liquid organic solvent which is substantially immiscible with said solution, said solvent containing at least one oxygen atom capable of donating an electron pair to a coordination bond, and separating the resultant extract phase containing thorium salt and raffinate phase.

3. A process for the separation of thorium from a mixture containing thorium and a type 4f rare earth which comprises dissolving the mixture in an aqueous solution to provide an aqueous solution of thorium nitrate and rare-earth nitrate, adding to said aqueous solution at least one material of the group consisting of nitric acid, sodium nitrate, potassium nitrate, lithium nitrate, ammonium nitrate, magnesium nitrate, calcium nitrate, strontium nitrate, manganese nitrate, aluminum nitrate, and lanthanum nitrate, contacting the resulting solution with a liquid organic solvent which is substantially immiscible with said solution, said solvent containing at least one atom capable of donating an electron pair to a coordination bond, and separating the resultant extract phase containing thorium nitrate and the aqueous raffinate phase containing rare earths.

4. The process of claim 3 in which the organic solvent is a glycol ether.

5. The process of claim 3 in which the solvent is the dibutyl ether of diethylene glycol.

6. The process of claim 3 in which the organic solvent is the dibutyl ether of tetraethylene glycol.

7. The process of claim 3 in which the organic solvent is a ketone.

8. The process of claim 7 in which the organic solvent is methyl isobutyl ketone.

9. The process of claim 3 in which the organic solvent is an alkyl phosphate.

10. The process of claim 3 in which the organic solvent is a trialkyl phosphate.

11. The process of claim 3 in which the organic solvent is tributyl phosphate.

12. The process of claim 3 in which the organic solvent is a nitrohydrocarbon.

13. A process for the purification of thorium containing a type 4f rare earth impurity, which comprises dissolving the thorium in an aqueous solution to provide a solution of thorium nitrate, adding nitric acid and calcium nitrate to the aqueous solution and adjusting the concentration of the thorium nitrate so that the resulting aqueous solution is 0.215 M in thorium nitrate, 3 M in nitric acid and 3 M in calcium nitrate, contacting said solution with methyl isobutyl ketone, and separating the resultant extract ketone phase containing thorium nitrate and the aqueous raffinate phase containing rare earth impurity.

References Cited in the file of this patent

UNITED STATES PATENTS

| | | |
|---|---|---|
| 1,323,735 | Berndt | Dec. 2, 1919 |
| 2,227,833 | Hixson et al. | Jan. 7, 1941 |
| 2,376,696 | Hixson et al. | May 22, 1945 |

OTHER REFERENCES

Misciatelli, Chemical Abstracts, vol. 25, pages 1452–3 (1931).

Mellor, Inorganic and Theoretical Chemistry, vol. 4, pp. 119–20. Published in 1923 by Longmans, Green and Co., London.

Wells, Journal of the Washington Academy of Sciences, vol. 20, pages 146–8 (1930).

Perschke, British Chemical Abstracts, 1926, A, pages 345.

Seidell, Solubilities of Inorganic and Metal Organic Compounds, 3rd ed., vol. 1, pages 892 and 894 (1940), D. Van Nostrand Co., N. Y.

Misciatelli, Gassetta Chimica Italiana, volume 60, pages 833 (1930).

Hackh's Chemical Dictionary, second edition (1937), page 827. Published by P. Blakiston's Son & Co., Philadelphia.

UNITED STATES PATENT OFFICE

CERTIFICATE OF CORRECTION

Patent No. 2,796,320                          June 18, 1957

Frank Harold Spedding et al.

It is hereby certified that error appears in the printed specification of the above numbered patent requiring correction and that the said Letters Patent should read as corrected below.

Columns 3 and 4, Table 1, third column thereof, under the heading "Molarity $HNO_3$", first number, for "4" read -- 3 --; same column, fourth number, for "3" read -- 1 --.

Signed and sealed this 13th day of January 1959.

(SEAL)
Attest:

KARL H. AXLINE
Attesting Officer

ROBERT C. WATSON
Commissioner of Patents